No. 856,632. PATENTED JUNE 11, 1907.
G. G. GRISWOLD.
MANURE SPREADER.
APPLICATION FILED OCT. 29, 1906.
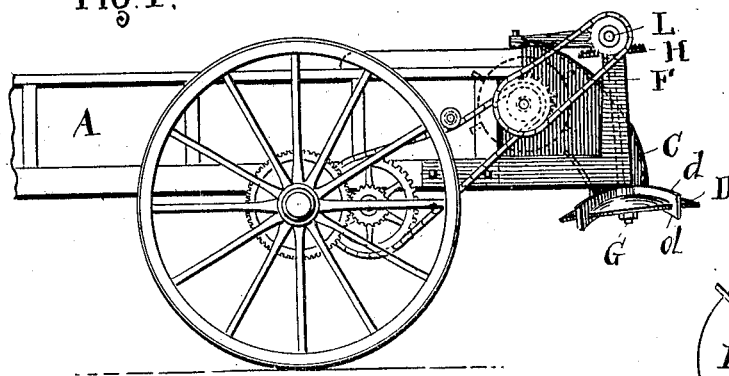
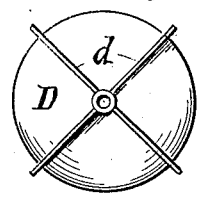
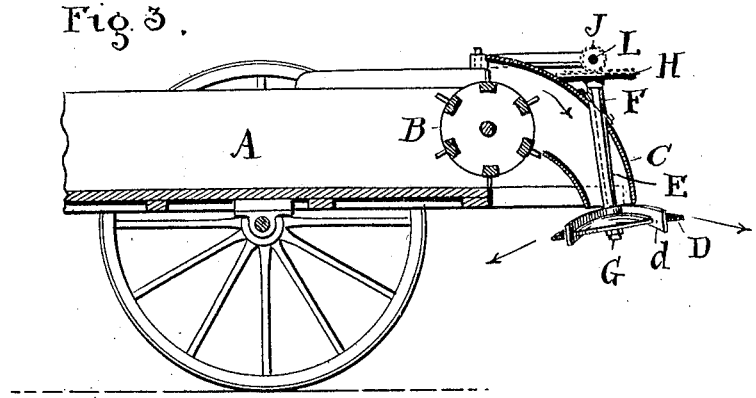
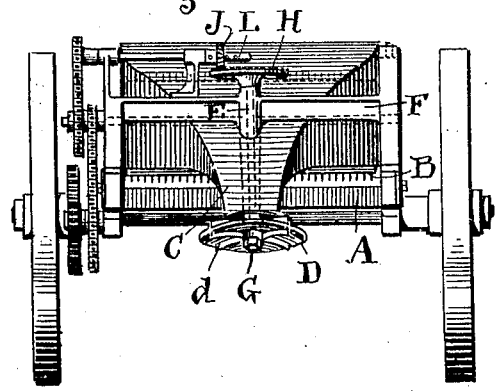
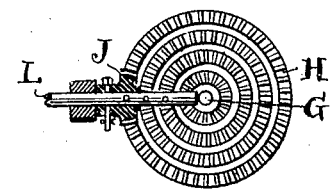
ATTEST,
R. G. Ketcham.
C. B. Snediker.
INVENTOR
Glen G. Griswold
By Fisher & Moser,
ATTYS.

UNITED STATES PATENT OFFICE.

GLEN G. GRISWOLD, OF MADISON, OHIO.

MANURE-SPREADER.

No. 856,632.

Specification of Letters Patent.

Patented June 11, 1907.

Application filed October 29, 1906. Serial No. 340,991.

*To all whom it may concern:*

Be it known that I, GLEN G. GRISWOLD, a citizen of the United States, residing at Madison, in the county of Lake and State of Ohio, have invented certain new and useful Improvements in Manure-Spreaders; and I do declare that the following is a full, clear, and exact description of the invention, which will enable others skilled in the art to which it appertains to make and use the same.

My invention relates to manure spreaders, and the invention consists in a distributing attachment adapted to be connected with and to supplement the work of any and all manure spreaders of the present day, or at least all that have come to my knowledge.

Hitherto the main fault or objection found in mechanical spreaders of manure has been the narrowness of their throw, none with which I am familiar being able to cover more than three and a half or four and a half feet of width and necessitating the traversing of a field back and forth so often and in such close relation that the mere distribution of the manure when delivered to the field has been a great burden and consumed a great amount of time. This was and is objectionable particularly in plowed fields where the draft is heavy and much hauling unduly packs the soil. Now, my invention enters the art at this point, and successfully overcomes and remedies these objections and the limitations of the spreaders commonly in use by taking the manure therefrom at about the usual place of its discharge and applying a principle of spreading thereto which will easily and evenly compass a path of from twelve to forty feet across, the width of distribution more or less depending on sundry conditions, such as the dryness or moisture of the manure, its fineness or coarseness and its lightness or heaviness. Then again the speed of the distributing attachment enters into the calculation as a factor, according to conditions and according as a light or heavy spread be wanted.

Having these objects and operations in view, Figure 1 of the drawings represents a side elevation of a wagon equipped with an ordinary or every day spreader and my invention operatively related thereto, and Fig. 2 is a plan view of my spreader proper. Fig. 3 is a longitudinal sectional elevation of the wagon and parts shown in Fig. 1, and Fig. 4 is a rear elevation of the machine. Fig. 5 is a plan of gear mechanism for driving the spreader.

A represents a wagon and B a common form of revolving distributer set much as usual transversely of the rear end of the wagon, or wagon body, and adapted to throw the manure to the rear in a more or less comminuted and uniform spread, limited at the best to about the width of the wagon tread, while others deliver through spouts in rows and others may even differentiate from these operations within narrow limits. My invention on the contrary is a broad-casting device auxiliary to the revolving spreader in common use and receiving the manure therefrom through a delivery spout C. Said device consists of a preferably concavo-convex disk D of suitable proportions supported in a nearly horizontal position at the bottom of spout C by means of a fixed bearing sleeve E rigid with cross bar F of the wagon frame and a shaft G through said sleeve having said spreader mounted on its lower exposed end. A variable speed gear H of disk pattern with concentric teeth on its top surface is fixed on the upper end of shaft G and is meshed by pinion J on shaft L, which is power driven from one of the wheels of the wagon through any suitable power connections or from any available source of power about the wagon. Said pinion is adjustably fixed on shaft L so as to mesh the same with any one of the several series of teeth on gear H according to the speed of rotation desired for the spreader, and such speed will be subject to various conditions as hereinbefore indicated and as must be obvious. In any event, however, the speed must be rapid to cover a wide path of distribution and which will also thin the quantity left upon the ground, and said adjustment affords all the range of speed from slow to fast that the spreader may require, especially when considered in conjunction with the travel of the team. The said spreader has radial vanes or blades $d$ upon both sides, and the spout C is arranged to deliver the manure directly upon the center thereof as nearly as can be to promote evenness of work. A centrifugal action being imparted by the spreader it will throw the manure evenly in a complete circle a distance of as many feet from the center as may be desired, say from five feet up to ten and even twenty. The mouth of delivery spout or hood C is as wide at the top as distributer or beater B, and any available means may be employed to convey the manure in the wagon to the beater or distributer. The spreader being concavo-convex with blades or ribs on both sides it can be reversed according to the work to be done. Obviously, for a wide throw and fine distribution the convex side will be up, but for heavy manure and at least for some varieties of fertilizers the concave side will be on top.

By reason of spreading in a circle as the wagon moves along, the ground is practically covered as much as twice over and each square foot is sure to get its due proportion according to all the other surface covered. Obviously the spreader will contribute in some measure to fining the manure, both as it is dropped thereon and as it is cast off with greater or less velocity.

If desired the entire spreading attachment comprised in my invention may be removed and the revolving distributer or beater B will do its work alone as formerly. My invention therefor is in itself a complete and independent attachment designed to be sold in the market as such and to be used with the various makes of manure distributers now quite generally in use.

The spreader is shown as set at a slightly forward inclination to spread low in front and high behind, but I may arrange to give the same any desired tilt even to a reverse inclination if that be preferred. Being set low the spread of the manure is but slightly effected by wind at the most. It will be seen, also, that the attachment is light in weight as well as simple in construction with few added parts, and that the resistance or load introduced on this account is comparatively small and bears no proportion to the very great advantage derived from its superior work.

Practically the invention consists in the radial spreader itself with means to support and couple it up in operating position, and ultimately in its combination with the distributer.

The vanes, blades or ribs d are placed on both sides of the spreader when it is designed to be reversible, and they may have any desirable elevation and shape, so that they will promote the spreading of the manure or fertilizer. The spreader also may be made interchangeable so that as to use larger or smaller ones according to the material to be spread.

What I claim is:

1. A disk for a manure spreader having radial vanes on both sides and adapted to be reversed.

2. A reversible disk for a manure spreader concavo-convex in cross section and provided with radial vanes on both sides, whereby a long or short throw can be given the manure.

3. A manure spreader of disk shape and a shaft supporting the same in a substantially horizontal position, in combination with a toothed revolving distributer on a plane above said spreader and a chute for conveying the manure from the distributer centrally upon said spreader, said chute having a width at its top substantially equal to the length of said distributer and narrowed to said spreader at its lower end.

In testimony whereof I sign this specification in the presence of two witnesses.

GLEN G. GRISWOLD.

Witnesses:
R. B. MOSER.
H. T. FISHER.